Sept. 18, 1962    L. J. THOMPSON    3,054,939
REGULATED POWER SUPPLY
Filed Dec. 24, 1958
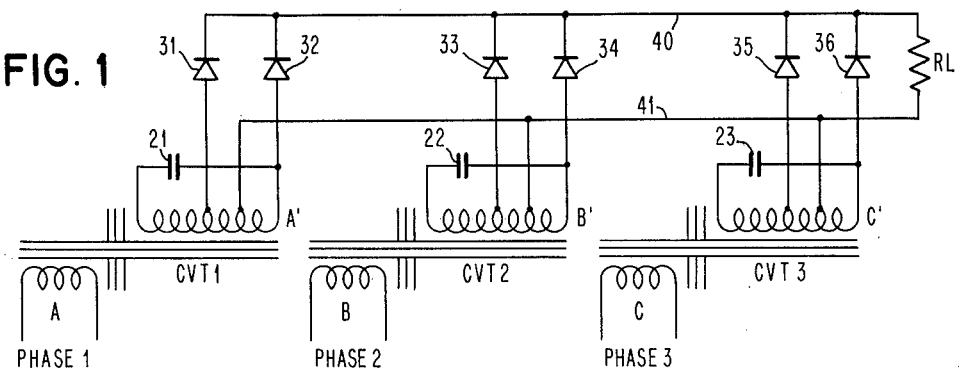
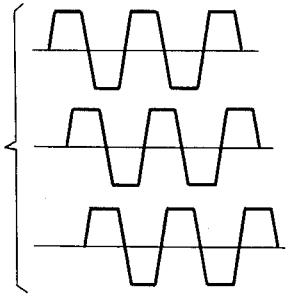
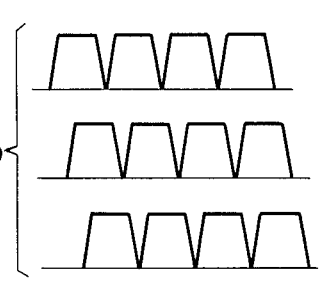
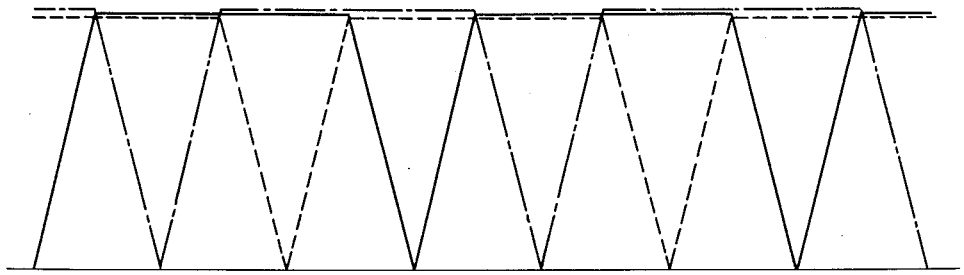
FIG. 4
INVENTOR.
LEON J. THOMPSON
BY
*J. W. Armbruster*

United States Patent Office 3,054,939
Patented Sept. 18, 1962

3,054,939
REGULATED POWER SUPPLY
Leon J. Thompson, Poughkeepsie, N.Y., assignor to International Business Machines Corporation, New York, N.Y., a corporation of New York
Filed Dec. 24, 1958, Ser. No. 782,812
1 Claim. (Cl. 321—16)

The invention relates to electrical converting means and more particularly to means for producing a substantially smooth direct current power supply derived from a three phase alternating current source through three constant voltage transformers connected in parallel with diode rectification and without the use of the usual smoothing output capacitor.

An object of the invention is to provide an improved D.C. power supply by the use of a plurality of ferroresonant transformers through which an alternating current is commutated.

Another object of the invention is the provision of a direct current supply which has very little ripple through the use of a plurality of constant voltage transformer secondaries connected in parallel through full wave rectifiers.

A further object of the invention is the elimination of relatively large filter capacitors in electrical converting devices.

A still further object of the invention is to put to novel use the square wave outputs of a plurality of ferroresonant transformers which are energized from a plural phased power source.

Other objects of the invention will be pointed out in the following description and claim and illustrated in the accompanying drawings, which disclose, by way of example, the principle of the invention and the best mode, which has been contemplated, of applying that principle.

In the drawings:

FIGURE 1 shows the circuit connections for connecting a three phase A.C. input to three constant voltage transformer and rectifier connections in parallel to supply direct current to a load across the output lines.

FIGURE 2 shows the unrectified but flat topped output of the three transformers.

FIGURE 3 shows the rectified and related output of the three waveforms which are combined for an improved resultant.

FIGURE 4 shows the combined result of the three phase rectified outputs showing the overlapping properties of the waveforms which result in a low degree of ripple in the output voltage.

The invention deals with means for providing a regulated D.C. power supply with low ripple. A high purity D.C. is produced from a three phase A.C. source such as could be used for computer systems. The design approaches the ideal system of rectifying square waves and applying the rectified square wave to a common load to produce D.C. without ripple while eliminating the usual comparatively large smoothing capacitors or other low frequency filter.

Although illustrated in connection with a three phase A.C. source, it is apparent that two phase, six phase, or other varieties of multi-phase input may be employed and the same novel advantages derived therefrom.

The system is based on the use of ferroresonant transformers (also known as constant voltage transformers, voltage stabilizing transformers, etc.) which are operated at high flux densities (overexcited) to produce approximately square waves or flat topped waves. Three such transformers excited by a three phase power source and are connected full wave rectifier connections so that current commutation takes place to produce a D.C. output.

Since the transformers inherently regulate for input voltage deviation, there can exist considerable phase unbalance which is attenuated by the regulating action. Tests have shown that less than 5% peak to peak ripple is possible without capacitors as compared to approximately 15% ripple in a conventional supply (i.e. a three phase rectified supply with sine output and no capacitor). Since the wave form is substantially flat topped, the peak rectifier currents are reduced which results in better rectifier operation. As representative of the constant voltage type of transformer, reference may be made to the expired Patent 2,143,745.

Reference to FIGURE 1 shows that the three phases of the A.C. input are wired to the three primary windings A, B and C of three constant voltage transformers CVT1, CVT2 and CVT3. The secondary windings A', B' and C' of the same transformers are connected in parallel with the usual resonating capacitors 21, 22 and 23 and are tapped centrally with connections to separate rectifiers 31, 33 and 35 leading to one of the output leads 40 extending to the load RL which is energized by the direct current output. The secondary windings are tapped further at an intermediate point to provide separable connections to the other output lead wire 41 which is connected to the other side of the load RL. A series of right end connections are made to the secondary transformer coils A', B' and C'. Such attachments are at the ends of the secondaries and are connected to one side of three other rectifiers 32, 34 and 36, the other sides of which are separately connected to the output lead 40.

Although the connections from the transformer secondaries to the rectifiers 31, 33 and 35 are shown schematically as made at the center, this is not necessarily the electrical center of the winding. The number of turns between these connections which connect rectifiers 31, 33 and 35, and 32, 34, 36, determine the desired output voltage of the system. It is the taps which are connected between said connections and which are tied together to the bottom end of the load resistance RL, which are truly centrally located. In practice, it may be desirable to connect the resonating capacitors to any of the taps shown or as rearranged. It is also possible that there should be two or more secondary windings. One of such windings would be connected to the resonating capacitor, and another winding would be center tapped and used as the output.

Each ferroresonant transformer may actually be built on two physically separate cores, the one being the linear inductance element, and the other the non-linear inductive element, across which the resonant capacitor is connected, and in which the output winding is placed.

Taking the first transformer CVT1 as an example, it will be noted that the square wave A.C. input to the two rectifiers 31 and 32 is fully rectified and will appear as shown at the top of FIGURE 3 after being treated beyond the preliminary transformer output showing as given at the top of FIGURE 2. When all three transformer outputs are considered, it will be realized that before rectification they appear as shown in FIGURE 2 with a form of commutating spacing due to the phasing of the three phase input. Then too, after rectification, the three output wave formations of the three transformers and associated rectifiers will appear as shown in FIGURE 3 with all depressions between waves mainly compensated for by the overlap of the waveforms. In FIGURE 4 it is shown that the resulting ripple from the combined effects of the wave formations in FIGURE 3 is such that the extent of ripple is no more than 5% and a great deal better than expected.

Regarding the particular values used for an example of the power supply of the present invention, it may be noted that the particular kind of constant voltage transformer used for one example is designated as GE 9T91Y1047. Associated with such transformers, as designated by reference numerals 21, 22 and 23 in FIGURE 1, are capacitors which could be GE Pyranol 21F432, rated as 6 microfarads, 660 v. A.C., 60 cycle. When three such transformers are connected as shown to a source of supply having a frequency of 60 cycles and voltage of 210, the output may be expected to be maintained so as to vary no more than 5% when operating at 32 volts and a current demand of 11.5 amperes. The particular rectifiers or diodes 31–36 suitable for use in the particular example mentioned may be identified as a germanium rectifier GE–4JA3011BC1BD1.

It is known that when a ferroresonant transformer feeds a rectifier system having a capacitor filter as ordinarily used for a D.C. power supply, certain complicated results are produced which are difficult to explain. One of the major results is that the output waveshapes from the transformer changes and becomes flat topped and appears trapezoidal in form. This result is used to advantage in a rectifier-capacitor power supply because the effect is to reduce the peak currents over that which would be obtained if the waveform were sinusoidal. The result is less output ripple and, in addition, since the peak currents are smaller, the rectifier can be operated less conservatively. It is also known that the flat topped or squareness of the wave can be accentuated by increasing the excitation of the transformer. These properties and results are derived from the inherent characteristics of non-linear ferromagnetic operations. In the present instance, it is proposed to use such characteristics in a new and useful way.

The present invention is concerned primarily with the fact that the square wave output operation can be obtained and synthetized without the use of the usual capacitor filter. This is accomplished by the use of a succession of pulses obtained from several phases of a multi-phase power system which feed into a particular rectifier, wave forms similar to those which would appear ordinarily with a capacitor in an intermediate position.

Ordinarily the output wave form of a ferroresonant transformer with a rectifier and capacitive load is dependent on the commutative characteristic which exists inherently. Assuming a stable circuit with a capacitive load, wherein the capacitor is large enough to sustain a voltage near peak value, as is usually the case in a power supply, if the circuit is examined when the transformer output voltage is rising from zero, it is found that at such a time and until such time as the instantaneous output voltage is equal to the instantaneous voltage on the capacitor, the rectifier is back-biased or cut-off and the transformer is operated in what is essentially a non-loaded condition. It is not until the instantaneous transformer voltage is greater than the capacitor voltage that the rectifier will conduct in its forward direction and when it does, in the case of a capacitor, the circuit suddenly becomes a low impedance. It is at this point that the wave form flattens out and appears flat topped.

A somewhat similar explanation seems to apply relative to the present invention except that the voltage across the rectifier in its back-biased condition is that voltage produced by previously conducting rectifiers of different phases rather than the output of the usual capacitor. This process may be referred to as a commutating load which implies that the load commutates between rectifiers and phases by a form of switching action and is responsible for the unusual flatness and usefulness of the transformer output wave forms.

While there have been shown and described and pointed out the fundamental novel features of the invention as applied to a preferred embodiment, it will be understood that various omissions and substitutions and changes in the form and details of the device illustrated and in its operations may be made by those skilled in the art without departing from the spirit of the invention. It is the intention, therefore, to be limited only as indicated by the scope of the following claim.

What is claimed is:

In a constant voltage electrical power supply: a source of multi-phase alternating current supply; a plurality of constant voltage transformers, each having a primary winding and a secondary winding, said transformers being of the type which produce a substantially flat topped voltage wave shape across the secondary thereof, the wave shapes across all of said secondaries being of substantially the same amplitude, each transformer being connected to a different phase of said supply through its primary winding; a pair of tapped output connections on each said secondary winding; a plurality of rectifiers, one associated with each of said output connections, each having a terminal of first polarity and a terminal of second polarity, each said rectifier being connected at its terminal of first polarity to its associated tapped output connection; a center tap on each of said secondary windings at the electrical center portion of said secondary winding between said tapped output connections; a pair of output leads, one of said leads being connected to each of said rectifiers at the terminal of second polarity of said rectifier and the other of said leads being connected to each of said center taps, to provide full wave rectification; whereby said output leads connect said secondary windings in parallel to produce a substantially smooth direct current output.

References Cited in the file of this patent

UNITED STATES PATENTS

| 1,158,474 | Fortescue | Nov. 2, 1915 |
| 1,806,351 | Jansson | May 19, 1931 |
| 2,143,745 | Sola | Jan. 10, 1939 |
| 2,694,177 | Sola | Nov. 9, 1954 |
| 2,753,513 | Sola | July 3, 1956 |

FOREIGN PATENTS

| 762,511 | Great Britain | Nov. 28, 1956 |